April 6, 1926. 1,579,613
R. A. HOLMES
ORNAMENTAL FIGURE TOY
Filed June 10, 1925
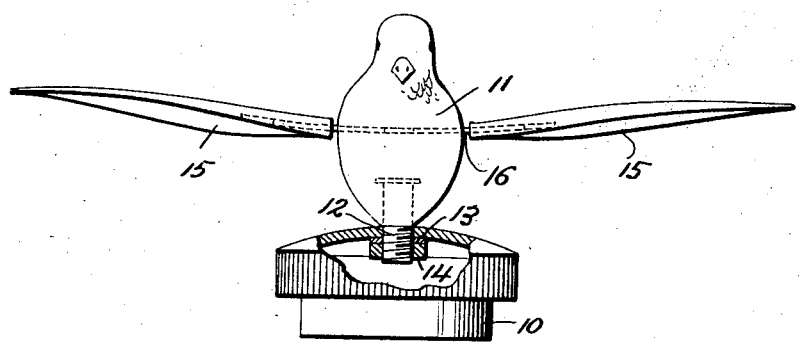
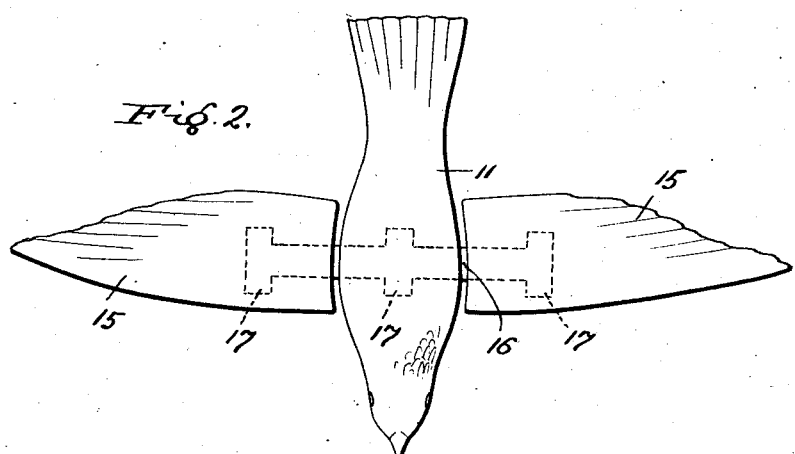
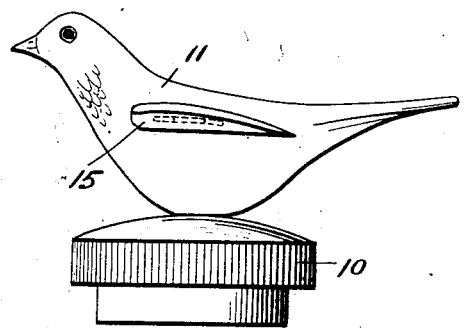
Raymond A. Holmes
INVENTOR
BY *Victor J. Evans*
ATTORNEY
WITNESS: *Gerald Hermey*

Patented Apr. 6, 1926.

1,579,613

UNITED STATES PATENT OFFICE.

RAYMOND A. HOLMES, OF CATONSVILLE, MARYLAND.

ORNAMENTAL FIGURE TOY.

Application filed June 10, 1925. Serial No. 36,198.

*To all whom it may concern:*

Be it known that I, RAYMOND A. HOLMES, a citizen of the United States, residing at Catonsville, in the county of Baltimore and State of Maryland, have invented new and useful Improvements in Ornamental Figure Toys, of which the following is a specification.

This invention relates to improvements in ornaments in form of birds of any description or figures which are arranged upon radiator caps of automobiles and which include leaf springs extending outwardly from their opposite sides and including wings thereon and when the said vehicle is in motion and upon encountering ruts and the velocity of the wind will cause the wings to move upwardly and downwardly and thus simulating a bird in flight.

With the above and other objects in view, the invention further includes the following novel features and details of construction, to be hereinafter more fully described, illustrated in the accompanying drawing and pointed out in the appended claims.

In the drawing:—

Figure 1 is a front elevation of my invention with radiator cap partly in section and showing the manner in which my invention may be applied thereto.

Figure 2 is a top plan view of my invention per se.

Figure 3 is a side elevation of my invention applied to a radiator cap of an automobile.

Referring to the drawing in detail, wherein like characters of reference denote corresponding parts, the reference character 10 indicates an automobile radiator cap of the usual or conventional type and which forms no part of the present application for Letters Patent but is merely shown for purposes of illustrating the manner in which my invention may be applied thereto. It is quite obvious from the subsequent description which will be hereinafter more fully apparent that this invention may be applied to all forms and types of radiator caps.

The invention residing in the provision of a figure 11, which in this instance is in the form of a bird and which may be constructed, moulded, or the like in the form of any sort of bird or figure, as it is to be understood that I do not limit myself to any one form of figure. Extending downwardly from the lower portion of the bird or figure 11, is the lower threaded end portion of a bolt or pin 12 which extends through an opening provided in the top of the radiator cap 10 and including a lock washer 13 and nut 14 upon its lower end in order that the said figure or bird 11 will be held rigidly and normally in a forwardly disposed position upon the upper portion of this radiator cap 10.

In order to provide means for mounting a pair of wings 15 upon the opposite sides of the figure or bird 11, I employ a relatively flat resilient strip or leaf spring 16 which extends transversely through the bird or figure 11 and within sockets provided in the inner sides of the wings 15 and rigidly held within the figure or bird 11 and wings 15 through the instrumentality of outwardly and oppositely extending enlarged portions 17 formed upon the end and intermediate portion of the leaf spring 16 and when so moulded as illustrated will be held against accidental displacement within the figure 11 and wings 15.

It will thus be noted from the foregoing description and accompanying drawing that this invention, owing to the simplicity of construction and arrangement of parts thereof, may be manufactured at a very low cost and will consequently appear upon all cars and owing to the relative arrangement of the resilient strip or leaf spring 16 connected to the wings 15, that the same will be caused to flap in the instance of a bird in flight by the velocity of the wind or the depressions or ruts in a roadway as will be encountered by the vehicle to which the figure or bird 11 is attached.

The invention is susceptible of various changes in its form, proportions and minor details of construction, and the right is herein reserved to make such changes as properly fall within the scope of the appended claims.

Having thus described my invention what I claim is:—

1. An ornament of the character described adapted to be placed upon a suitable portion of an automobile, a pin provided upon the lower portion of the ornament and rigidly secured to a portion of the vehicle, a resilient strip extending transversely through the upper portion of the ornament, and a pair of wings connected to the outer free ends of the resilient strip whereby the said wings will be moved upwardly and downwardly upon the vehicle encountering the ruts in the roadway and the velocity of the wind and simulating a bird in flight.

2. An ornament of the character described adapted to be placed upon an automobile radiator cap, means provided upon the ornament for removably securing the latter to the radiator cap, a pair of wings, and a resilient strip having outwardly and oppositely extending enlarged portions formed upon its ends and intermediate portion and adapted to be embedded within the ornament and wings, respectively.

In testimony whereof I affix my signature.

RAYMOND A. HOLMES.